United States Patent
Truong et al.

(10) Patent No.: US 6,769,645 B1
(45) Date of Patent: Aug. 3, 2004

(54) ELECTRONIC AUTOMATIC REPULSION SYSTEM

(76) Inventors: Mac Truong, 327 Demott Ave., Teaneck, NJ (US) 07666; Hugh Mac Truong, 327 Demott Ave., Teaneck, NJ (US) 07666

( * ) Notice: Subject to any disclaimer, the term of this patent is extended or adjusted under 35 U.S.C. 154(b) by 0 days.

(21) Appl. No.: 09/975,336

(22) Filed: Oct. 11, 2001

(51) Int. Cl.⁷ .............................................. B64C 13/16
(52) U.S. Cl. .................................. 244/76 R; 244/118.5
(58) Field of Search ........................ 340/483; 244/76 R, 244/189, 175, 1 R, 118.5

(56) References Cited

U.S. PATENT DOCUMENTS

| | | | | |
|---|---|---|---|---|
| 4,257,703 A | * | 3/1981 | Goodrich | 340/436 |
| 4,924,401 A | * | 5/1990 | Bice et al. | 244/181 |
| 4,964,598 A | | 10/1990 | Berejik et al. | |
| 5,150,026 A | * | 9/1992 | Seraji et al. | 318/567 |
| 5,240,207 A | | 8/1993 | Eiband et al. | |
| 5,349,533 A | * | 9/1994 | Libby | 318/587 |
| 5,488,563 A | * | 1/1996 | Chazelle et al. | 340/970 |
| 5,608,392 A | * | 3/1997 | Faivre et al. | 244/186 |
| 5,636,123 A | * | 6/1997 | Rich et al. | 342/29 |
| 6,049,756 A | * | 4/2000 | Libby | 318/587 |
| 6,102,332 A | | 8/2000 | Haxton et al. | |

FOREIGN PATENT DOCUMENTS

FR 2584842 A1 * 1/1987 ........... G08B/21/00

OTHER PUBLICATIONS

FR–2584842–a1 translation.*
PTO 2002–1427 translation of french document above.*

* cited by examiner

*Primary Examiner*—Michael J. Carone
*Assistant Examiner*—Timothy D. Collins
(74) *Attorney, Agent, or Firm*—John R. Ewbank

(57) ABSTRACT

Those hijackers seeking to commit suicide by crashing a plane into a selected target are frustrated because the selected targets, such as a nuclear plant or a governmental building, are provided with Repulsion Transmitters emanating an encrypted signal throughout a relatively small protective zonez. Planes are provided with receptors detecting such repulsion signals, together with discriminatory analyzers distinguishing between safe tangential travel through such zone and dangerous radial or spiral approach toward such target Both ground crew and the robotic controls within the plane are alerted and when appropriate, activated to re-route the plane to avoid the collision planned by the hijackers.

3 Claims, No Drawings

ELECTRONIC AUTOMATIC REPULSION SYSTEM

BACKGROUND OF INVENTION

Hijackers have been seizing commercial aircraft since about 1931. Although somewhat analogous to the problems of piracy of ships at sea, the uniqueness of hijacking passenger planes has stimulated much concern. One of the best summaries of seventy years of deterring hijacking of passenger planes is on the Internet at <http://www.gwu.edu/_cms/aviation/track_in/merari.html> setting forth a lecture by Professor Merari at a hijacking conference held Dec. 15, 1997. The hazards of excessively complicated software and computer systems, and the greater reliability of a plurality of independent more simplified computer systems was clarified by consultant Neumann at the same conference at hattp://gwu.edu/cms/aviation/track_ii/neumann.html. The world's attention was drawn to the inadequacies of thwarting hijackers on Sep. 11, 2001 when the Pentagon and World Trade Center were hit by hijacked planes.

Haxton et al 6,102,332 thwarts hijackers by providing a plane with a plurality of passenger compartments which are loaded at the airport, and thereafter attached to the mainframe of the plane. In the event that a hijacker gains control of tile cockpit, each compartment can be released from the plane so that it can utilize a large parachute for permitting the passengers to achieve a safe landing.

During WWII, the Germans employed "drones" or military planes which were pilotless, and hence suitable for crashing into targets Improved technology concerning transmission of television pictures permits improved drones, as clarified in Eiband et al 5,240,207. Remote control of pilotless planes desirably feature feedback concerning the most recent modifications of the course of the plane, as taught in Berejik et al 4,964,598

Although the automatic pilot systems generally dominate most of the flight of a passenger pane, the pilot can generally instantly dominate such automatic pilot, thus giving a pilot an opportunity to modify the course of the plane to avoid a collision or the like. Such flexibility is generally desirable. Hence, the thwarting of hijackers has generally been based on preventing the hijacker from gaining access to the plane controls, as distinguished from thwarting steps subsequent to the time when a hijacker is in charge of the cockpit.

BRIEF SUMMARY OF INVENTION

In accordance with the present invention, the hijacker in the cockpit is thwarted from achieving some of his intended aspirations by reason of the dominance of robotic controls which are activated in response to a system of discriminating precautions. Such robotic controls seek to thwart the hijacker so that at least some of the aspirations of the hijacker are not attainable. Information about the system for thwarting hijackers is intended to deter attempts at hijacking. It is the concept of a system for thwarting the hijacker after he controls the cockpit which is emphasized, recognizing that there might be a plausible range of alternatives within the general system for such concept. Because the invention concerns thwarting the hijacker after he controls the cockpit, automatic sending of emergency signals alerting ground crews to such takeover are significant benefits from the invention. Ground crews, such as the airport towers can maintain some surveillance of an aircraft for being assured that it is on its intended course, and can communicate with pilots when illness or engine trouble prompts a change of course. Improved surveillance of planes for detecting change of course without adequate explanation permits some systems for thwarting a hijacker in the cockpit. Military planes are capable of shooting down an aircraft having a sufficiently dangerous course, but only if ground crews have been alerted to the emergency.

DETAILED DESCRIPTION OF INVENTION

A potential target such as the U.S. Capitol Building, or a nuclear plant, is provided with a plurality of Repulsion Transmitters emitting a confidential encrypted signal for a plausible distance such as 2 kilometer. Each commercial plane is provided with Repulsion receivers adapted to detect the electronic signals from such Repulsion Transmitters whenever such plane comes within the range of the Repulsive Transmitters. A Discriminating Analyzer monitors such signals, and particularly the rate at which there is increase in the intensity of the signal. from the Repulsion Transmitters. If the rate of increase is so rapid, as to indicate that the course of the plane is radially toward the Repulsion Transmitters, then the Electronic Automatic Repulsion Response System within the plane is actuated. If the course of the plane is merely tangentially through the zone of influence of the Repulsion Transmitters, the Discriminating Analyzer recognizes such tangential course of the plane without actuating the Electronic Automatic Repulsion System within the plane. If the discriminating Analyzer diagnoses the course of the plane as a spiral by reason of the relatively slow but persistent acceleration of the intensity of the signal, then the Electronic Automatic Repulsion System is actuated.

The term "ground crew" refers to all varieties of aircraft surveillance benefiting from any alert about the presence of a hijacker in the cockpit. Desirably each pilot is provided with a "deadpan switch" which the pilot intentionally maintains in a closed position upon entering the cockpit, and which the pilot can either intentionally modify, or which is automatically modified upon the death of the pilot. When such deadpan-pilotswitch is activated, a radio signal is sent to the ground crew that an emergency exists in the cockpit of such plane. Such signal would be coded so that the exact identity,location and direction of the plane would be instantly recognized. Because of the rarity of use of system, it would require no manual surveillance, but could merely sound an alarm and provide a video readout of which plane was sending such emergency signal, like an automatic SOS.

Similarly, whenever the Electronic Automatic Repulsion System was activated, the ground crew would automatically receive a SUPER-SOS message identifying the explicit plane. Because of the great rarity of such signals, no manual surveillance for such signals would be needed, because the alarm and the explicit identification of the plane would provide the relevant information.

Previous systems for thwarting hijackers have focused on preventing the hijacker from entering the cockpit, as distinguished from the present system of coping with the situation of the hijacker in the cockpit. The alarm systems to ground crew, as previously outlined, are innovations which would permit ground crew to take prompt action of an appropriate nature, such as sending military planes after the hijacked pane.

Emergency Robotic Controls would receive instructions from either ground crew or a computer having a memory of instructions for a plurality of diversionary tactics. A Discriminating Analyzer would monitor the course of the plane and the speed with which the plane was moving toward the target having the Repulsion Transmitters. Normally a turn to the right would be an appropriate tactic, but sometimes circumstances might favor a turn to the left or changing the course upwardly. Such Automatic modification of the course of the aircraft would effectively protect the structure having the repulsion transmitters, thus possibly preventing a nuclear accident worse than Chernobyl.

In another modification of the invention, two way communication would be established between the aircraft and the ground crew, so that the ground crew could dominate the remote control of the robotic controls instead of the on-board package of instructions. Because such remote control of the plane would be possible only after the ground crew had been alerted that a hijacker was in the cockpit.

Sometimes the crash of an airplane into a mountain is inexplicable, with some theories that suicidal hijackers have been at the controls. In another modification of the invention, the plane is provided with a radar system constantly monitoring the distance from any obstacle toward which the plane was headed. A discriminatory analyzer could sound alarms to the pilot, and could also activate the robotic controls for making a U-turn soon enough to avoid such obstacle. Such combination of monitored radar, discriminating analyzer, package of instructions and emergency robotic controls would also effectively detect any attempt by a hijacker to nose-dive the plane toward the ground, thereby using the emergency orbiter controls, instructions, and radar monitoring for sending the aircraft t on an upward course to avoid crashing into the ground. Computers of twenty years ago were too slow to be able to accomplish the discriminating analysis required for an emergency robotic control of a passenger aircraft.

Because hijacking has become more glamorous since Sep. 11, 2001, there are potentialities for hijackers to gain control of private planes, freight planes, military planes, dirigibles, and the like. The licensing of the invention might be separate as regards the various categories. Although described primarily in connection with commercial passenger planes, the invention is useful for many kinds of aircraft. Each embodiment is merely illustrative and not a limitation of the invention.

DESCRIPTION OF ILLUSTRATIVE EMBODIMENTS

EXAMPLE 1

A military transport plane is modified to provide a plurality of television cameras adapted to send signals to ground crew only when the emergency robot control system was activated. A radar system for the monitoring of obstacles directly ahead would feed its signals to a discriminating analyzer which would send an emergency signal to both ground crew and the emergency robot control system only when an extreme emergency justified such drastic action. Each pilot would wear a ring having a battery-power transmitter which so long as the pilot intended for the ring to be in its normal position, would emit no signal, but which would send within the cabin a radio signal whenever the ring was shifted to position its face adjacent the palm of the hand. If a hijacker gained control of the cockpit, the pilot could shift the face of the ring toward the palm, thereby actuating an alarm signal to the ground crew. The plane would be equipped with robotic controls and a plurality of systems for controlling the robotic controls. A Radar Discriminatory Analyzer could select and actuate one of a plurality of sets of instructions for robotic control when the monitoring of the radar indicated the necessity for such emergency action.

A Repulsion Discrimination Analyzer would select one of a plurality of sets of instructions when the monitoring of the repulsion signals indicated the necessity for such emergency action. If ground crew had previously been alerted that a hijacker was controlling the cockpit, and if the ground crew were monitoring the off-course movements of the plane through some system approximately equivalent to a Global Positioning System, and if no on-board instructions had taken over, then but only then could the ground crew actuate the remote control system. In that event, the ground crew could provide the instructions to the robotic controls for controlling the course of the aircraft.

Although hijackers have more difficulty in controlling the cockpit of a military plane, the hijacker in the military plane could deceive friendly aircraft for gaining access to difficult targets. Hence, protecting military planes from conditions arising after a hijacker controls a cockpit merits attention during eras when surprise is emphasized by enemies. When controlled remotely by ground crew, the controls could resemble those previously used for the control of drones. When providing with packages of instructions controlled by a Discriminating Analyzer, the robotic controls could resemble those employed in target-seeking drones.

EXAMPLE 2

A corporate jet plane is modified to include the supplemental equipment outlined in Example 1, and is thereafter captured so that a hijacker controls the cockpit. The hijacker directs the course of the plane toward a nearby nuclear plant protected by the repulsion transmitters of the present invention. Because the repulsion transmitters emit coded electronic signals which are detected by the repulsion receivers on the plane, and analyzed by the Discriminating Analyzer for such signals. Because the analyzers interpret the rate of approach as radially toward the target, the Discriminating Analyzers activate the emergency robotic controls. The Discriminating Analyzer selects a swing to the left, thereby avoiding any collision with the target contemplated by the terrorist.

EXAMPLE 3

A commercial airplane is provided with receivers for repulsion signals and a Discriminating Analyzer for such Repulsion Signals, together with a package of instructions. Such plane is provided with robotic controls which are normally inactivated, and are activated only by the Repulsion Discriminating Analyzer. Such a plane could fly tangentially to a structure protected by the repulsion transmitters of the present invention without actuating the emergency system. However, if the plane were to be on course for a potential collision with the structure protected by the Repulsion Transmitters, then the Discriminating Analyzer would activate one of the package of instructions so that the robotic control would fly the plane to avoid the collision intended by the hijacker.

Various modifications of the invention are possible without departing from the invention as set forth in the claims.

The invention claimed is:

1. Aircraft having repulsion receivers, said receivers of repulsion signals being adapted to receive signals from repulsion transmitters protecting a structure from aircraft entering a shielding zone of repulsion signals, said structure serving only land-based projects remote from an aircraft landing strip, which signals are processed by an on-board Discriminating Analyzer to activate on-board robotic controls to modify instantly the course of such aircraft to avoid collision with the protected structure.

2. The aircraft of claim 1 in which such Discriminating Analyzer ignores a course of the aircraft which is generally tangential to such zone of repulsion signals but which activates the robotic controls when the course of the aircraft is approximately radial toward such protected structure and the distance is dangerously close to such protected structure.

3. A method for protecting a building from aircraft in which a structure serving only land-based projects remote from an aircraft landing strip, said structure being provided with repulsive transmitters, and an aircraft is provided with on-board repulsion signal receivers and the aircraft is provided with on-board Discriminating Analyzers processing the signals received by such repulsive signal receivers, and the Discriminating Analyzers activate on-board robotic controls when the course of the aircraft endangers such protected structure, such robotic controls instantly modifying the course of the aircraft.

* * * * *